United States Patent [19]

Halderman

[11] Patent Number: 5,505,284

[45] Date of Patent: Apr. 9, 1996

[54] DEVICE FOR SELECTIVE ACTUATION OF ELECTRIC SOLENOID IN A TORQUE CONVERTER LOCK-UP CLUTCH BY A VEHICLE ELECTRONIC CONTROL MODULE

[76] Inventor: James D. Halderman, 145 Golfwood Dr., Dayton, Ohio 45449

[21] Appl. No.: 293,389

[22] Filed: Aug. 19, 1994

[51] Int. Cl.[6] .................................................. F16D 33/16
[52] U.S. Cl. ............................ 192/3.31; 192/3.3; 477/65
[58] Field of Search ............................ 477/62, 64, 65, 477/174, 175; 192/3.3, 3.31

[56] References Cited

U.S. PATENT DOCUMENTS

| | | | |
|---|---|---|---|
| 4,416,358 | 11/1983 | Kapp | 192/3.31 |
| 4,478,322 | 10/1984 | Carlson et al. | 477/169 |
| 4,665,770 | 5/1987 | Van Selous | 477/62 |
| 4,676,353 | 6/1987 | Matsuda | 192/3.31 |
| 4,691,812 | 9/1987 | Takizawa | 192/3.3 |
| 4,730,709 | 3/1988 | Kawata et al. | 192/3.31 |

FOREIGN PATENT DOCUMENTS 2707174  8/1977  Germany ..................... 477/64

*Primary Examiner*—Charles A. Marmor
*Assistant Examiner*—Sherry Estremsky
*Attorney, Agent, or Firm*—Biebel & French

[57] ABSTRACT

An aftermarket device for permitting an electric solenoid of a torque converter lock-up clutch to be selectively actuated and deactuated by a vehicle electronic control module only when the vehicle is operating above a predetermined vehicle speed, or is operating in the high gear ratio. The device includes a switching transistor in the supply voltage side of an electric solenoid which enables the solenoid by coupling a source voltage to the solenoid from a brake switch. The switching transistor can either be an "NPN" or an "PNP" type depending upon whether a pressure activated contact switch in the transmission is "normally open" or "normally closed".

21 Claims, 6 Drawing Sheets

DEVICE FOR SELECTIVE ACTUATION OF ELECTRIC SOLENOID IN A TORQUE CONVERTER LOCK-UP CLUTCH BY A VEHICLE ELECTRONIC CONTROL MODULE

FIELD OF THE INVENTION

This invention relates to an electronic control device for a torque converter clutch, and more specifically to an electronic control device which permits an electric solenoid of the torque converter clutch to be selectively actuated and deactuated by a vehicle electronic control module only when the vehicle's speed is above a predetermined level, or the vehicle's transmission is operating in a high gear ratio.

BACKGROUND OF THE INVENTION

It is known to use a torque converter lock-up clutch in a torque converter of an automatic transmission to improve vehicle performance, and particularly engine gas mileage. Early torque converter lock-up clutches were hydraulically controlled by transmission valve bodies. Following the development of computerized engine control systems, torque converter lock-up clutches are now predominantly controlled by a vehicle's electronic control module (ECM).

A torque converter conventionally provides a fluid coupling between an output shaft of an engine and an input shaft of an automatic transmission. The torque converter functions primarily as a torque multiplication device to increase the amount of engine output torque delivered to the automatic transmission. In certain modes of engine operation, torque multiplication is not desirable and serves only to reduce engine performance and fuel economy. Thus, a torque converter lock-up clutch is used to selectively mechanically couple, or lock up, the engine output shaft to the automatic transmission input shaft to eliminate the torque multiplication function of the torque converter and improve engine performance. The lock-up clutch is typically rotatably fixed to the input shaft of the transmission and can be selectively engaged with an impeller drive plate of the torque converter which is rotatably fixed to the engine output shaft. When engaged to the impeller drive plate, the lock-up clutch, and hence the transmission input shaft, is directly mechanically coupled to the engine output shaft and thus rotates therewith to eliminate torque multiplication.

In most instances, a torque converter lock-up clutch is controlled by an electric solenoid which selectively positions a hydraulic fluid shuttle valve in accordance with an actuation signal applied to the solenoid. The shuttle valve operates to regulate hydraulic fluid pressure acting on the lock-up clutch. When hydraulic fluid pressure acting on the lock-up clutch is increased, the lock-up clutch is displaced to disengage from the impeller drive plate and effect torque multiplication. When hydraulic fluid pressure is reduced, the lock-up clutch engages with the impeller drive plate and a direct mechanical connection is established to eliminate torque multiplication.

The electric solenoid of the lock-up clutch is actuatably controlled by a signal generated by an ECM in response to various engine operating conditions. In accordance with an engine control algorithm, the ECM typically monitors various engine operating parameters through sensors such as a throttle position (TP) sensor and a manifold absolute pressure (MAP) sensor to determine whether to actuate or deactuate the lock-up clutch electric solenoid.

With most vehicle transmissions, under certain engine operating conditions, the engagement and disengagement of the lock-up clutch via the ECM can occur frequently with, or without the transmission ever shifting gears, i.e. downshifting or upshifting to a different gear ratio. The frequent engagement and disengagement of the lock-up clutch causes a bothersome effect known as "transmission hunting" whereby the transmission appears to be indecisively shifting between gear ratios in a quest to determine the optimal gear ratio for the given engine operating condition.

In vehicles which incorporate automatic transmissions, it is desirable to delay the actuation and/or deactuation of the torque converter lock-up clutch until the transmission is operating in a 4th or high gear ratio, or at least until the vehicle is operating above a predetermined speed to minimize the effects of actuating and deactuating the lock-up clutch.

FIGS. 5 and 6 illustrate two embodiments of a known aftermarket device 10 which actuates an electric solenoid 12 of a torque converter lock-up clutch (not shown) only when (1) a vehicle is operating above a predetermined speed, or the transmission is in a high gear ratio, and (2) a brake pedal (not shown) is not depressed. A "normally closed" brake switch 16 supplies a 12 VDC source voltage to a first side of the electric solenoid 12 only when the brake pedal is not depressed.

Once the device 10 detects that the transmission has shifted into the high gear ratio, or that the vehicle is operating above the predetermined speed, a switching transistor is forward biased which couples a second side of the electric solenoid to ground. As long as the brake pedal is not depressed, the electric solenoid 12 will remain actuated to cause the lock-up clutch to engage an impeller drive plate (not shown) of the torque converter as previously described. If the brake pedal is depressed while the lock-up clutch is engaged, the brake switch 16 will "open" to deactuate the electric solenoid 12 and reestablish a fluid coupling between the engine and automatic transmission so that the vehicle will decelerate uniformly. Otherwise, a direct mechanical connection between the engine and automatic transmission would cause an undesirable "jerking" sensation during deceleration of the vehicle.

FIG. 5 illustrates one embodiment of the known aftermarket device which includes a PNP switching transistor 18 for actuating and deactuating the electric solenoid 12, and a "normally open" pressure activated contact switch 20 which closes when a predetermined hydraulic fluid pressure level in a hydraulic fluid passageway (not shown) of the transmission 14 is reached. The pressure switch 20 closes only when the vehicle is operating above a predetermined speed, or the transmission is in the high gear ratio.

FIG. 6 illustrates another embodiment of the known aftermarket device which includes an NPN switching transistor 22 for actuating and deactuating the electric solenoid 12, and a "normally closed" pressure activated contact switch 24 which opens when a predetermined hydraulic fluid pressure level in a hydraulic fluid passageway (not shown) of the transmission 14 is reached. The pressure switch 24 opens only when the vehicle is operating above a predetermined speed, or the transmission is in the high gear ratio.

The known aftermarket device 10 is installed by first disconnecting the existing wiring harness connector coupled to a receptacle on the transmission extension housing. Second, a male-type connector end of device 10 is connected to the receptacle on the transmission housing, and a female-type connector end of device 10 connected to the existing wiring harness connector. On most transmissions, either one of the pressure contact switches 20, 24 is installed within the transmission by the manufacturer. However, on transmissions without a pressure switch already provided, a plug can be removed from the transmission housing and an external pressure activated contact switch can be threadably coupled thereto for communication with the high pressure fluid passageway. Further, for transmissions utilizing a "normally closed" pressure activated contact switch as shown in FIG. 6, an external ground lead 26 of device 10 must be connected to a vehicle ground.

One disadvantage of the known aftermarket device 10 is that, once installed, the device 10 disables an electronic control module (ECM) 28 such that the ECM can no longer assert control over the electric solenoid 12 under any circumstances. The ECM is disabled because the ground side of the electric solenoid 12 is controlled by the respective switching transistors 18, 22 in place of a first control line 30 of the ECM when the device 10 is installed.

A vehicle incorporating the known aftermarket device 10 was tested by an EPA certified laboratory for compliance with EPA vehicle exhaust emission requirements. The results of the test indicated that under certain driving conditions, i.e. travelling up a slight incline with a constant throttle position, the aftermarket device 10 failed to release the lock-up clutch so that torque multiplication could be utilized. As a result, the vehicle developed a lean misfire condition wherein $NO_x$ emissions were increased beyond acceptable EPA limits. The failure of the EPA emission test was a direct result of the device 10 circumventing the ECM control over the lock-up clutch because the ECM is typically programmed to release the lock-up clutch under such driving conditions. As a result of the failed EPA test, the California Air Resources Board (CARB) has refused to grant permission for marketing and/or selling the known aftermarket device 10 within the state of California.

Thus, it is an object of the present invention to provide an aftermarket device for permitting an electric solenoid of a torque converter lock-up clutch to be selectively actuated and deactuated by a vehicle electronic control module only when the vehicle is operating above a predetermined speed, or the transmission is in a high gear ratio.

It is also an object of the present invention to provide a device for disabling an electric solenoid of a torque converter lock-up clutch when a vehicle transmission is not operated in a high gear ratio, and for enabling the electric solenoid to be selectively controlled by a vehicle electronic control module only when the vehicle is operating above a predetermined speed, or the transmission is in the high gear ratio.

It is yet another object of the present invention to provide a simple, cost effective, and quick aftermarket solution to the problem of "transmission hunting".

It is a further object of the present invention to provide an aftermarket device which utilizes existing sensors, switches and hydraulic passages to control the operation of a power transistor which permits actuation and deactuation as an electric solenoid of a torque converter lock-up clutch under certain engine operating conditions.

It is a further object of the present invention to provide a non-invasive aftermarket device to solve the problem of "transmission hunting" without the need to modify the transmission or the ECM outputs connected thereto.

It is a further object of the present invention to provide an add-on device which relies solely upon an output signal from a hydraulic pressure contact switch to determine whether to enable or disable an electric solenoid of a torque converter lock-up clutch.

These and other objects and advantages of the invention will be apparent from the following description, the accompanying drawings and the appended claims.

SUMMARY OF THE INVENTION

According to the present invention, there is provided a torque converter clutch control device having an arrangement for permitting an electric solenoid of a torque converter lock-up clutch to be selectively actuated and deactuated by a vehicle electronic control module only when the vehicle is operating above a predetermined vehicle speed.

There is also provided a torque converter clutch control device having an arrangement for enabling an electric solenoid of a torque converter lock-up clutch to permit selective control of the electric solenoid by a vehicle electronic control module only when a vehicle transmission is operating in a high gear ratio.

Also, there is provided a torque converter lock-up clutch control device having an electric actuator for controlling whether a lock-up clutch engages with an impeller drive plate of a torque converter to directly couple an output shaft of an engine to an input shaft of a transmission, a pressure sensor for determining when the transmission has shifted to a high gear ratio, and a switching arrangement responsive to the pressure sensor for enabling and disabling the electric actuator in accordance with a signal generated by the pressure sensor wherein the actuator is responsive to a vehicle electronic control module only when enabled by the switching arrangement.

DETAILED DESCRIPTION OF THE PREFERRED EMBODIMENTS

Figure 1:
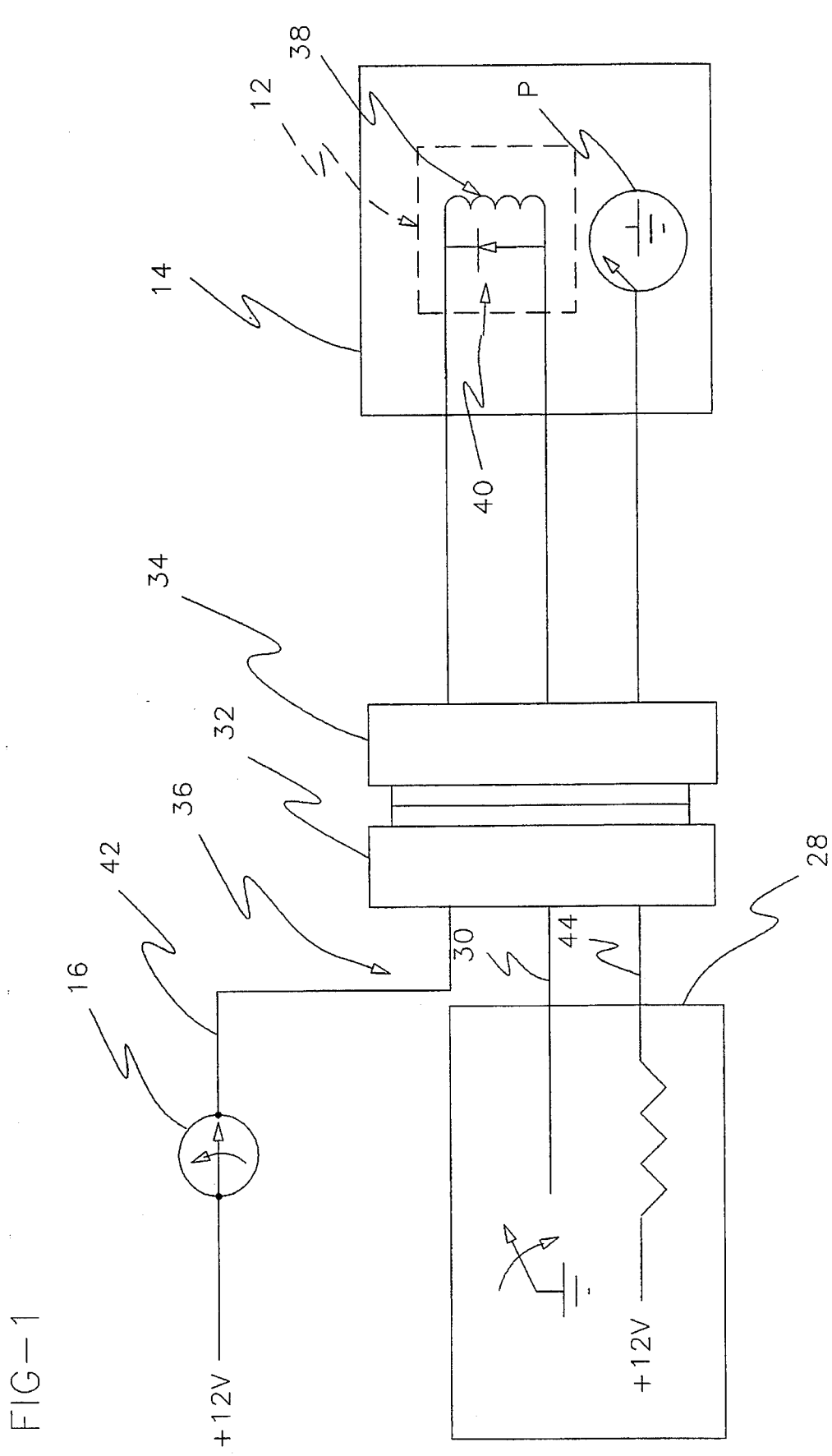
FIG. 1 is a schematic illustration of a conventional electronic control module connected to an automatic transmission without the device of the present invention installed.

Referring now to FIG. 1, there is conventionally shown the vehicle transmission 14 electrically connected to the electronic control module (ECM) 28 and the "normally closed" brake switch 16 via connectors 32 and 34. The wiring harness connector 32 forms part of an existing wiring harness 36, and the receptacle connector 34 is mounted through the housing of the transmission 14.

The transmission 14 includes the electric solenoid 12 of a torque converter lock-up clutch (not shown) and a pressure activated contact switch P. The solenoid 12 includes a winding 38 and a parallel surge protection diode 40 which limits voltage spikes to protect the contacts of the brake switch 16 from arcing. The pressure activated contact switch P communicates with a high pressure hydraulic fluid passageway (not shown) within the transmission 14. The "normally closed" brake switch 16 provides 12 VDC to a first side of the electric solenoid 12 vic a line 42 only when a brake pedal (not shown) is not depressed.

The ECM 28 includes first and second control lines 30 and 44, respectively. The first control line 30 provides a switchable system ground connection to a second side of the electric solenoid 12 based upon a conventional engine control algorithm executed in the ECM 28. The second control line 44 is connected to the pressure activated contact switch P which provides the ECM with an indication of when the vehicle is operating above a predetermined speed, or the transmission is operating in the high gear ratio.

Figure 2:
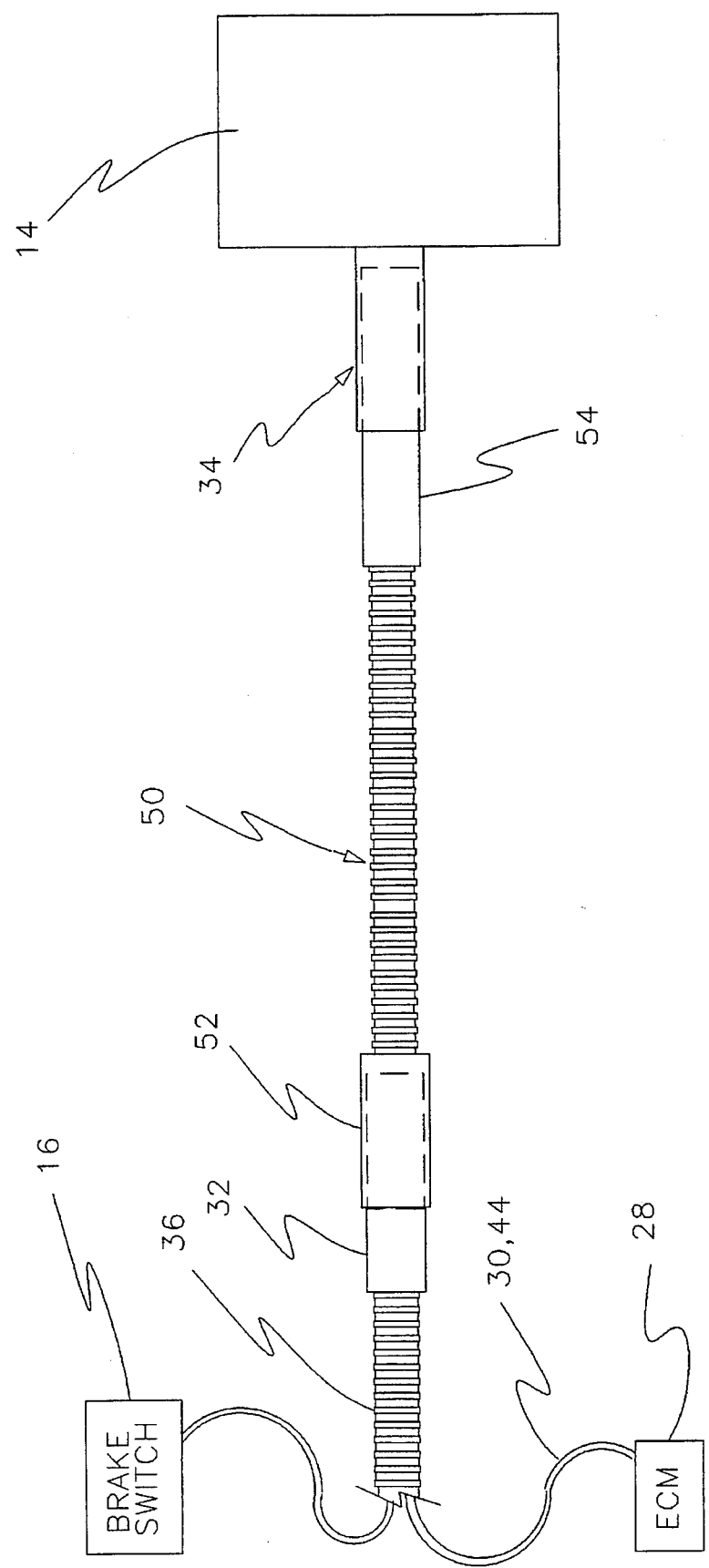
FIG. 2 is a schematic illustration of the aftermarket device in accordance with this invention.

With reference to FIG. 2, there is shown an aftermarket, or add-on device 50 of the present invention installed between the transmission 14, and the ECM 28 and brake switch 16. The device 50 includes a first female-type connector 52 connected to the connector 32 of the existing wiring harness 36, and a second male-type connector 54 connected to the connector 34 mounted through the housing of transmission 14. The device 50 is installed by first disconnecting the existing wiring connector 32 from the receptacle connector 34 on the transmission housing. Second, the male-type connector 54 is connected to the receptacle connector 34, and the female-type connector 52 is connected to the wiring harness connector 32.

Figure 3:
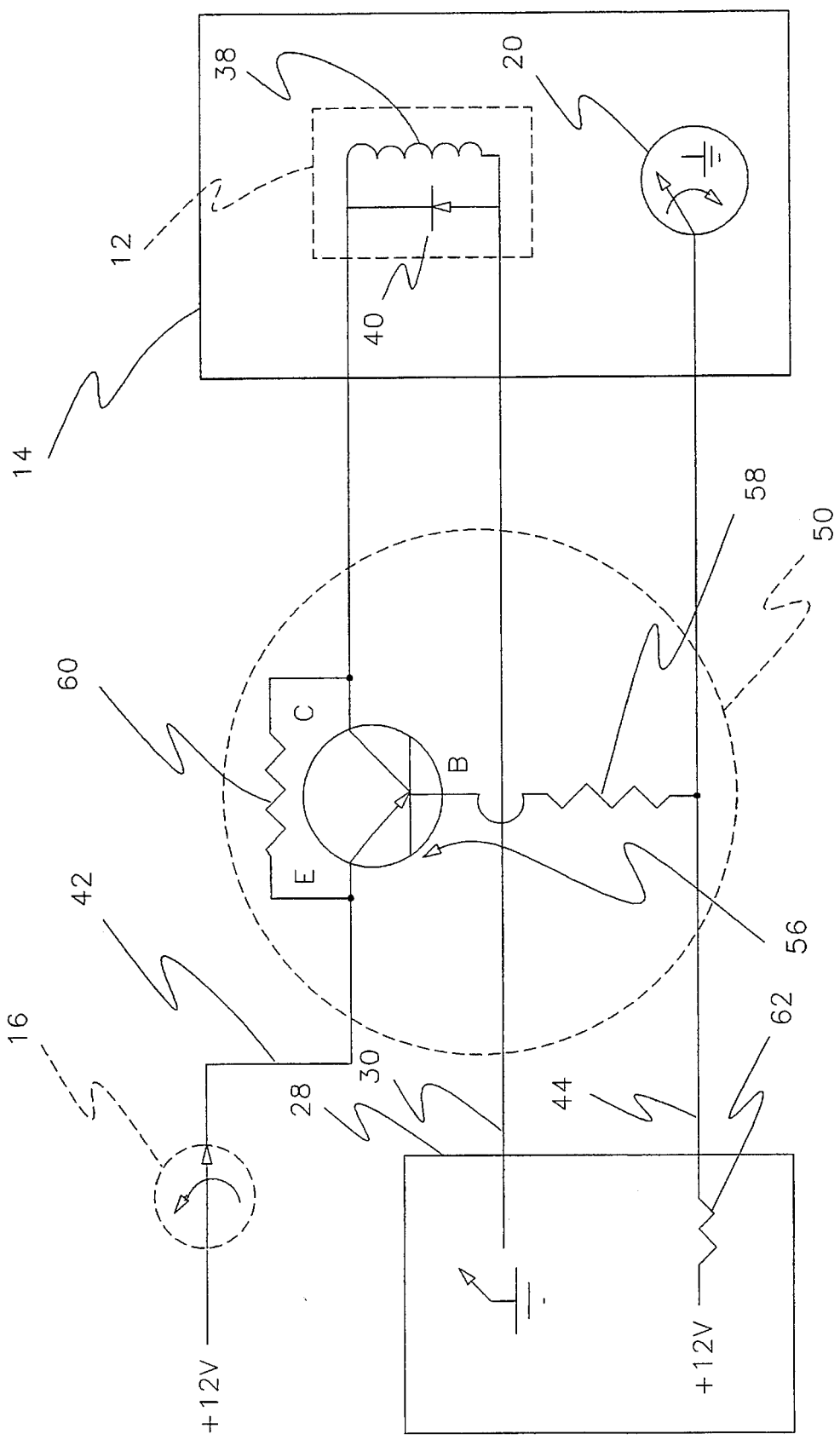
FIG. 3 is a schematic illustration of the first embodiment of the device shown in FIG. 2.

Referring now to FIG. 3, there is shown a first embodiment of the device 50. The first embodiment illustrates the use of a PNP switching transistor 56 to enable and disable the electric solenoid 12. The transistor 56 is located on the first or supply voltage side of the electric solenoid 12 between the brake switch 16 and the winding 38. The base terminal B of transistor 56 is connected to the "normally open" pressure switch 20 and the second control line 44 of the ECM via a current limiting series resistor 58. The emitter terminal E of transistor 56 is connected to the brake switch 16, and collector terminal C is connected to the winding 38 of solenoid 12. The first control line 30 is directly connected to the second or ground side of the solenoid 12. Some manufacturers have incorporated a fault detection routine into the ECM which looks for a voltage level on first control line 30 to indicate that the winding 38 is not open. Thus, a resistor 60 is placed in parallel with the emitter E and collector C terminals of the transistor 56 to develop a higher voltage level across the solenoid when actuated to prevent the ECM from generating a fault indication.

The transmission 14 includes the "normally open" pressure activated contact switch 20 which closes when a predetermined hydraulic fluid pressure level in a hydraulic fluid passageway (not shown) of the transmission is reached. As with the known device 10, the switch 20 closes only when the vehicle is operating above a predetermined speed, or the transmission is in the high gear ratio.

When the pressure switch 20 is open, i.e. when the transmission is not in the high gear ratio, or the vehicle is operating below the predetermined speed, 12 VDC on second control line 44 is applied to the base terminal B of transistor 56 through a pull-up resistor 62 to reverse bias the transistor 56. When the transistor 56 is reverse biased, the electric solenoid 12 is isolated from the supply voltage and thus prevented from being actuated regardless of whether the brake switch 16 is open or closed.

Assuming that the brake switch 16 is closed, i.e. no braking, when the vehicle operates above the determined vehicle speed, or the transmission shifts into the high gear ratio, the pressure switch 20 closes. With switch 20 closed, current flows in control line 44 and the vehicle ground potential is applied to the base terminal B of transistor 56 to drive the transistor into conduction. With the transistor 56 forward biased, 12 VDC is coupled to the first side of the winding 38 of the solenoid 12 to enable the solenoid 12 to be actuated. The solenoid remains enabled as long as the brake switch 16 and the pressure switch 20 remain closed. While enabled, the solenoid 12 can be actuated and deactuated by selectively connecting the second side of the solenoid 12 to the vehicle ground potential via control line 30 under the control of the manufacturer's engine control program being executed in the ECM. When actuated, the solenoid 12 remains actuated and the lock-up clutch remains engaged with the impeller drive plate as long as (1) the brake switch 16 is not opened by depressing the brake pedal, (2) the pressure switch 20 is not opened by dropping below the predetermined vehicle speed, or shifting into a lower gear ratio, and (3) the ECM maintains the ground potential connection on first control line 30. When any one of these situations occur, the solenoid 12 deactuates and the lock-up clutch disengages from the impeller drive plate to reestablish the fluid connection.

Figure 4:
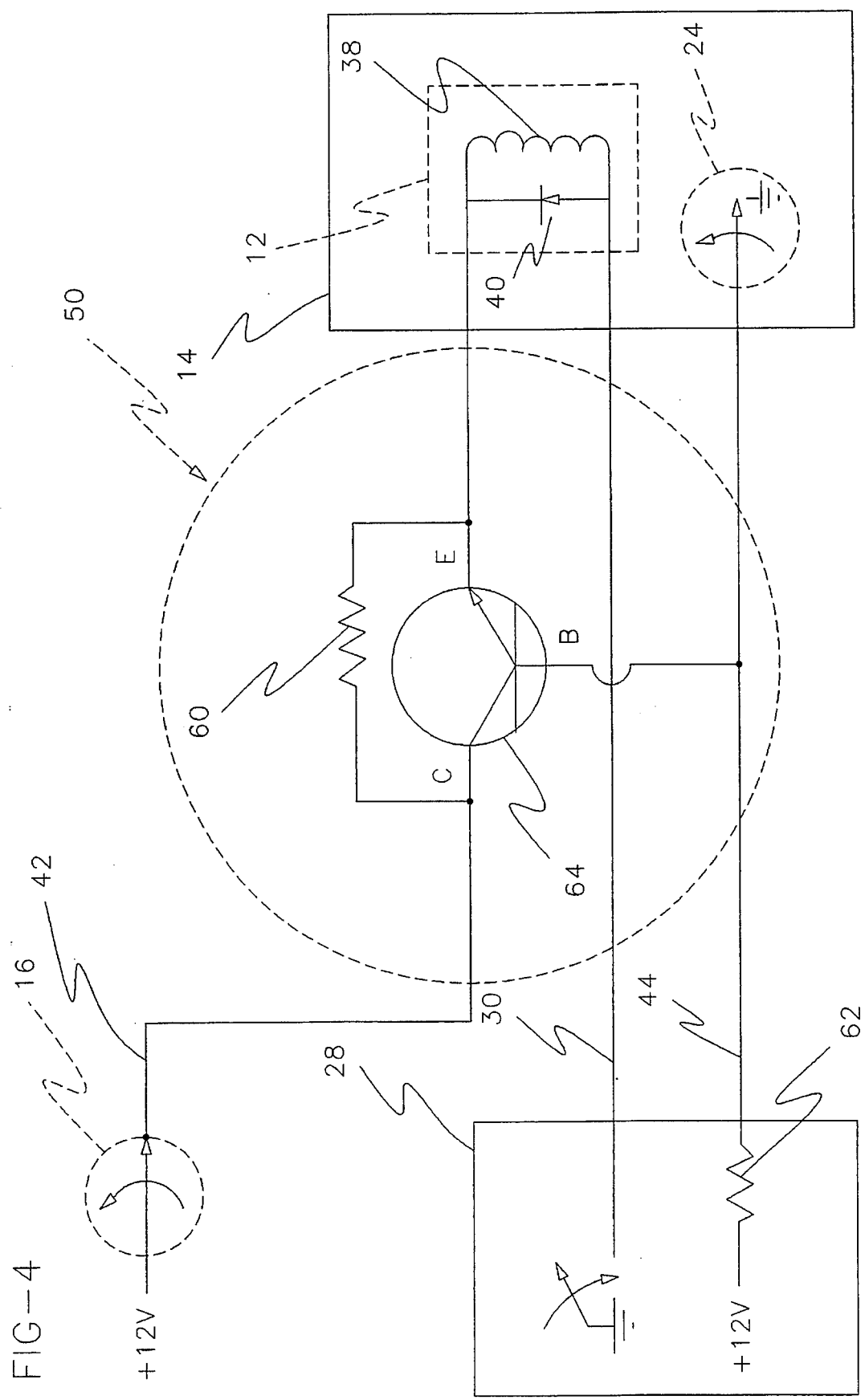
FIG. 4 is a schematic illustration of a second embodiment of the device shown in FIG. 2.
Figure 5:
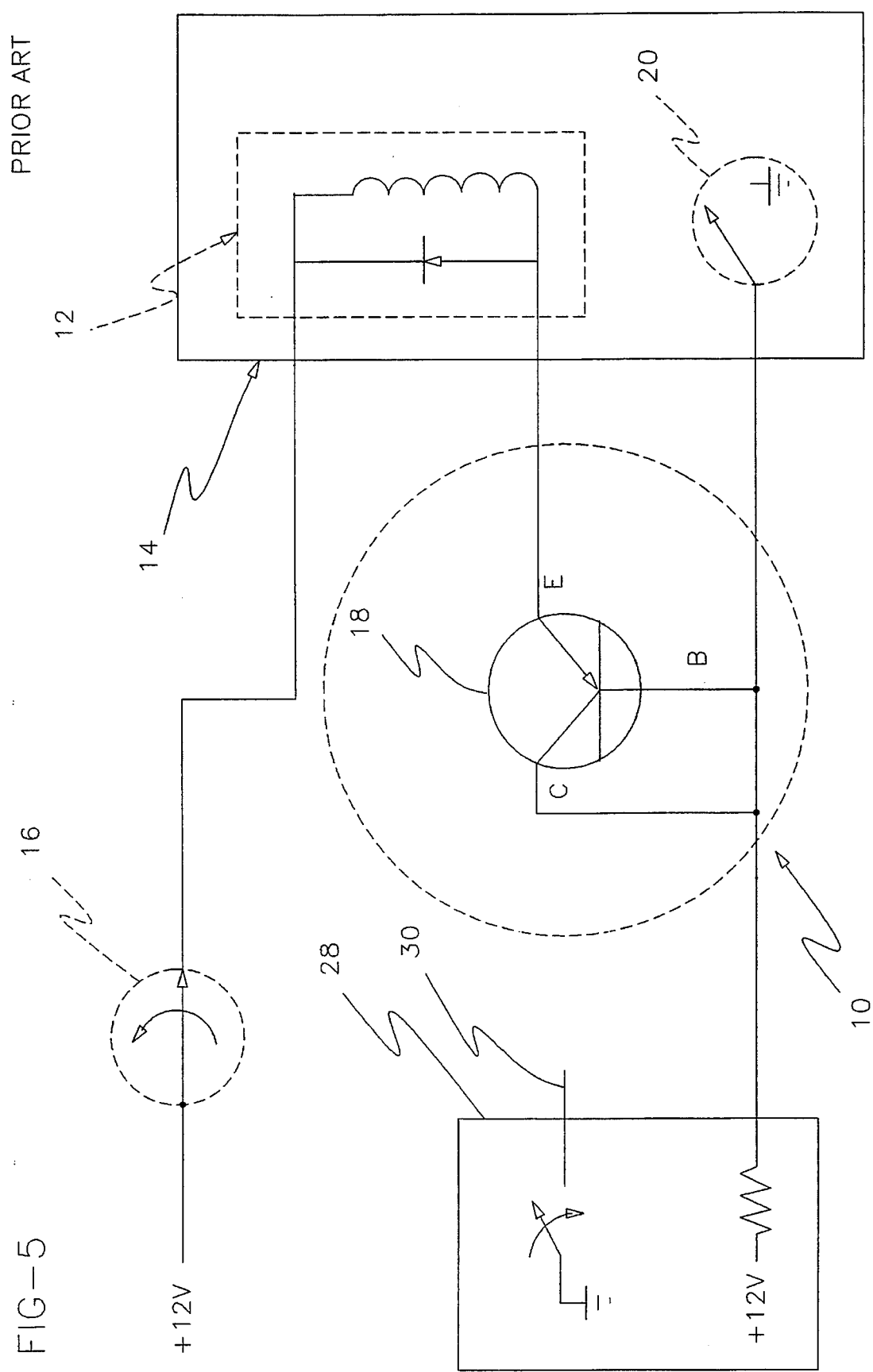
FIGS. 5 and 6 are schematic illustrations of two different embodiments of a prior art add-on device.
Figure 6:
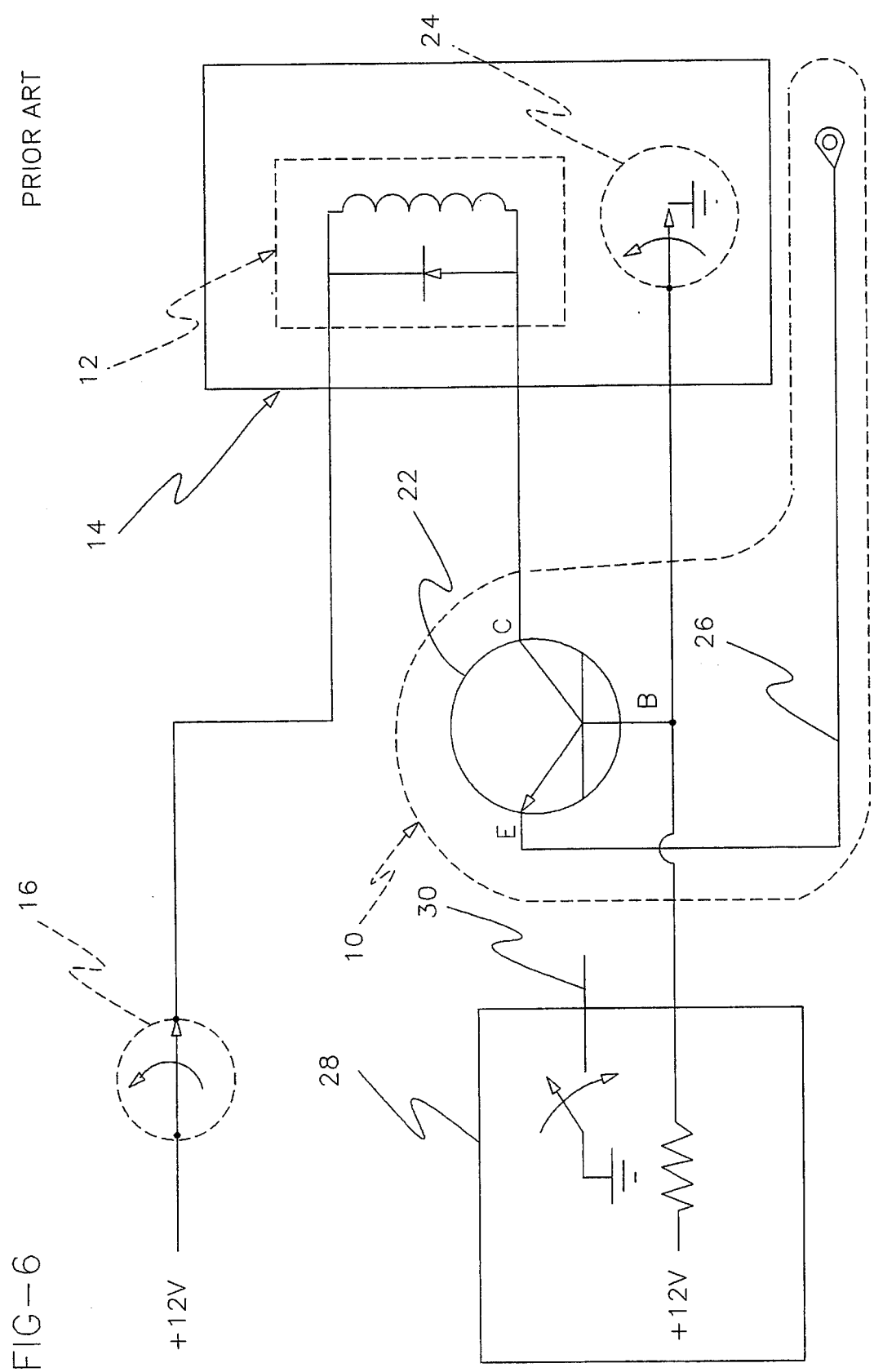

Referring now to FIG. 4, there is shown a second embodiment of the device 50. The second embodiment illustrates the use of an NPN switching transistor 64 to enable and disable the electric solenoid 12. The transistor 64 is similarly located on the supply voltage side of the solenoid 12 between the brake switch 16 and the winding 38. The base terminal B of transistor 64 is connected to the "normally closed" pressure activated contact switch 24 and the second control line 44 of the ECM. The emitter terminal E of transistor 64 is connected to the winding 38 of solenoid 12, and collector terminal C is connected to the brake switch 16. The first control line 30 is directly connected to the second or ground side of the solenoid 12.

The "normally closed" pressure activated contact switch 24 opens when a predetermined hydraulic fluid pressure level in a hydraulic fluid passageway (not shown) of the transmission is reached. Typically, the switch 24 opens only when the vehicle is operating above a predetermined speed, or the transmission is in the high gear ratio.

When the pressure switch 24 is closed, i.e. when the vehicle is not above the predetermined speed, or the transmission is not in the high gear ratio, current flows in control line 44 and the vehicle ground potential is applied to the base terminal B of transistor 64 to reverse bias the transistor. With the transistor 64 reverse biased, the electric solenoid 12 is isolated from the supply voltage and prevented from being actuated regardless of whether the brake switch 16 is open or closed.

Assuming that the brake switch 16 is closed, when the vehicle operates above the predetermined speed, or the transmission shifts into the high gear ratio, the pressure contact switch 24 opens. With switch 24 open, no current flows in line 44 and 12 VDC is applied to the base terminal B of transistor 64 to forward bias the transistor. With the transistor 64 forward biased, 12 VDC is coupled via the collector and emitter terminals to the first side of the winding 38 of the solenoid 12 to enable the solenoid 12. The solenoid remains enabled as long as the brake switch remains closed and the pressure switch 24 remains open. While enabled, the solenoid 12 can be actuated and deactuated by selectively connecting the second side of the solenoid 12 to the vehicle ground potential via control line 30 under the control of the manufacturer's engine control program executed in the ECM. Once actuated, the solenoid remains actuated and the lock-up clutch remains engaged with the impeller drive plate as long as (1) the brake switch 16 is not opened by depressing the brake pedal, (2) the pressure switch 24 is not closed by the vehicle dropping below the predetermined vehicle speed, or the transmission shifting into a lower gear ratio, and (3) the ECM maintains the ground potential connection on control line 30. When any one of these situations occur, the solenoid 12 deactuates and the lock-up clutch disengages from the impeller drive plate to establish the fluid connection.

Thus, with both embodiments of the present invention, the torque converter lock-up clutch is disabled while the vehicle is not operating above a predetermined vehicle speed, or the transmission not operating in the high gear ratio to prevent the abovementioned "transmission hunting" problem. Further, both embodiments of the present invention permit the ECM to maintain complete control over the torque converter lock-up clutch when the vehicle is operating above a predetermined vehicle speed, or the transmission is in the high gear ratio. This is evidenced by the fact that the device 50 has been certified for sale in California as complying with all required EPA automotive emissions test standards.

While the forms of the device herein described constitute the preferred embodiments of the invention, it is to be understood that the invention is not limited to these precise forms of device, and that changes may be made therein without departing from the scope of the invention which is defined in the appended claims.

What is claimed is:

1. A device for permitting an electric solenoid of a torque converter lock-up clutch to be selectively actuated and deactuated by a vehicle electronic control module, comprising; first sensing means for signalling when a vehicle transmission is operating above a predetermined vehicle speed, second sensing means for signalling when a brake pedal is not depressed, and means for enabling the electric solenoid only when the vehicle transmission is operating above the predetermined vehicle speed and the brake pedal is not depressed, the electronic control module actuating and deactuating the electric solenoid only while the electric solenoid is enabled by the enabling means.

2. The device claimed in claim 1, further including first connector means for connecting to an existing connector mounted on a housing of the transmission, and a second connector means for connecting to an existing wiring harness connector.

3. The device claimed in claim 1, wherein the first sensing means includes a pressure activated contact switch, and the means for enabling includes a transistor having a base terminal connected to the pressure contact switch.

4. The device claimed in claim 3, wherein the second sensing means includes a "normally closed" contact switch which couples a supply voltage to a first side of the electric solenoid through an emitter terminal and a collector terminal of the transistor when the transistor is forward biased.

5. The device claimed in claim 4, wherein the electronic control module includes switching means for switchably connecting a second side of the electric solenoid to a system ground potential.

6. A device for enabling an electric solenoid of a torque converter lock-up clutch to permit selective control of the electric solenoid by a vehicle electronic control module, comprising: first sensing means for signalling when a vehicle transmission is operating in a high gear ratio, second sensing means for signalling when a brake pedal is not depressed, and switching means for enabling the electric solenoid only when the vehicle transmission is operating in the high gear ratio and the brake pedal is not depressed, the electronic control module actuating and deactuating the electric solenoid only while the electric solenoid is enabled by the switching means.

7. The device claimed in claim 6, further including first connector means for connecting to an existing connector mounted on a housing of the transmission, and a second connector means for connecting to an existing wiring harness connector.

8. The device claimed in claim 6, wherein the first sensing means includes a pressure activated contact switch, and the switching means includes a transistor having a base terminal connected to the pressure contact switch.

9. The device claimed in claim 8, wherein the second sensing means includes a "normally closed" contact switch which couples a supply voltage to a first side of the electric solenoid through an emitter terminal and a collector terminal of the transistor when the transistor is forward biased.

10. The device claimed in claim 9, wherein the electronic control module includes a second switching means for switchably connecting a second side of the electric solenoid to a system ground potential.

11. A device for controlling actuation of a torque converter lock-up clutch in a vehicle transmission comprising:

means for electrically actuating said torque converter lock-up clutch;

a pressure sensing means for determining when the vehicle transmission has shifted to a high gear ratio; and a switching means responsive to the pressure sensing means for enabling and disabling the electric actuator means in accordance with a signal generated by the pressure sensing means, the electric actuator means being responsive to a vehicle electronic control module only when enabled by the switching means.

12. The device claimed in claim 11, wherein the switching means is a transistor having a base terminal connected to the pressure sensing means and to a pull-up resistor of the electronic control module.

13. The device claimed in claim 12, wherein the transistor is a PNP-type transistor.

14. The device claimed in claim 13, wherein the pressure sensing means includes a "normally open" pressure activated switch which communicates with a high pressure passageway of the transmission.

15. The device claimed in claim 12, wherein the transistor is an NPN-type transistor.

16. The device claimed in claim 15, wherein the pressure sensing means includes a "normally closed" pressure activated contact switch which communicates with a high pressure passageway of the transmission.

17. The device claimed in claim 12, further comprising a second switch means for supplying a source voltage to a first side of the electric actuator means when a brake pedal is not depressed and the transistor is forward biased.

18. The device claimed in claim 17, wherein the electronic control module includes means for selectively connecting a second side of the electric actuator means to a system ground potential.

19. The device claimed in claim 18, wherein the pressure sensing means is a pressure activated contact switch which communicates with a hydraulic fluid passageway within the transmission.

20. The device claimed in claim 19, wherein the contact switch is mounted within the transmission.

21. The device claimed in claim 19, wherein the contact switch is externally mounted to the transmission.

* * * * *